J. B. RUNNER.
TROWEL.
APPLICATION FILED NOV. 21, 1911. RENEWED JULY 9, 1913.
1,080,075.
Patented Dec. 2, 1913.
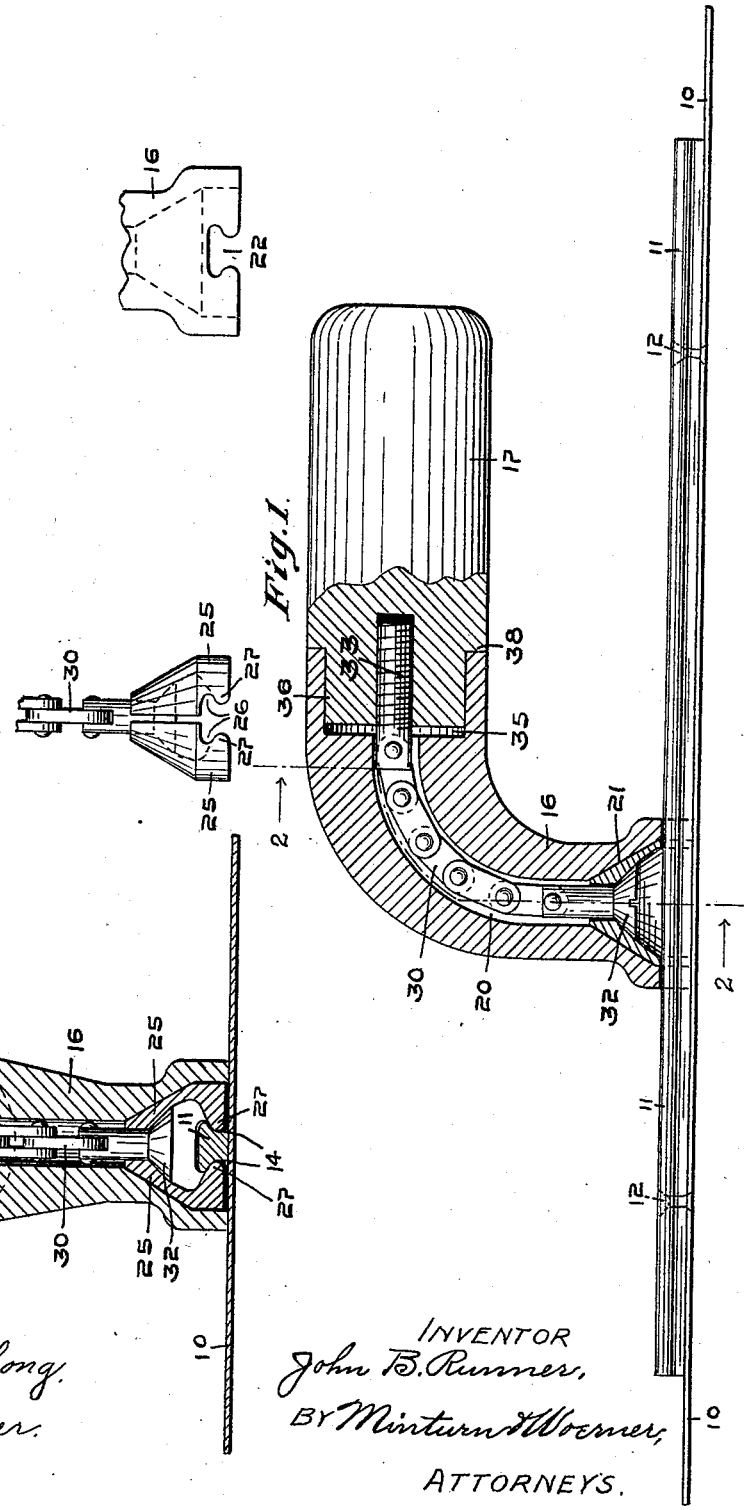
WITNESSES
Wm. L. Bushong
L. B. Woerner
INVENTOR
John B. Runner,
BY Minturn & Woerner,
ATTORNEYS.

UNITED STATES PATENT OFFICE.

JOHN B. RUNNER, OF INDIANAPOLIS, INDIANA, ASSIGNOR TO STANDARD TOOL & MANUFACTURING COMPANY, OF INDIANAPOLIS, INDIANA, A CORPORATION OF INDIANA.

TROWEL.

1,080,075.  Specification of Letters Patent.  Patented Dec. 2, 1913.

Application filed November 21, 1911, Serial No. 661,583. Renewed July 9, 1913. Serial No. 778,174.

*To all whom it may concern:*

Be it known that I, JOHN B. RUNNER, a citizen of the United States, residing at Indianapolis, in the county of Marion and State of Indiana, have invented certain new and useful Improvements in Trowels, of which the following is a specification.

This invention relates to hand trowels employed among plasterers and cement workers for applying and finishing wall and floor surfaces with either plaster or cement; and the object of the invention is to provide trowels of the above character with adjustable handles so that the relative position of the latter with respect to the blades may be changed in order to properly balance the tools to suit the individual taste of the operator.

I accomplish the object of the invention by means of the trowel illustrated in the accompanying drawings, forming a part hereof, in which—

Figure 1 is a view in which the blade of the trowel is shown in side elevation, and a portion of the handle is shown in section. Fig. 2 is a cross-section through the handle and blade on the line 2—2 in Fig. 1. Fig. 3 is a side elevation of the jaws for clamping the handle fast to the trowel blade. Fig. 4 is a view in elevation of the lower end of the trowel handle where it engages the trowel blade.

Referring to the drawings, 10 represents the blade of the trowel which is usually composed of thin sheet steel and is rectangular in form. The blade 10 is provided with a rib 11 which extends longitudinally along the central portion of said blade, said rib being secured to the blade by means of a plurality of rivets 12. The rib 11 adds rigidity to the blade 10 and also provides means by which the handle may be secured to said blade. Examining Fig. 2 of the drawings it will be noted that the sides of the rib 11 are provided with longitudinally extending channels 14, the upper meeting edges of the sides and top of said rib being round so as to eliminate sharp corners to prevent injury to the knuckles of the operator. The handle of the trowel is formed of the slidable member 16 and rotatable member 17, the former engaging the rib 11 and extending upwardly at right angles to the blade and is then curved and extends parallel with the blade.

The member 16 is provided with a centrally located aperture 20 which terminates in the lower end of said member in a conically shaped socket 21. The lower end of the member 16 is provided with a slot 22 (see Fig. 4) which forms a passageway for the rib 11. A pair of conically shaped jaws 25 are inserted into the conically shaped socket in the lower end of the member 16, and the two jaws are recessed at 26 to form projections 27 which engage the longitudinal grooves 14 in the rib 11. The conically shaped exterior of the surfaces of the jaws 25 engaging the corresponding internal surfaces of the socket 21 cause the jaws 25 to move toward each other and against the rib 11 when the jaws 25 are moved upwardly. This upward movement of the jaws 25 is effected by means of a head 32, resting within the jaws 25, and flexible shank 30. The shank 30 comprises a plurality of pivotally connected links to enable said shank to move through the curved aperture 20 formed internally in the member 16 of the handle, the last member of said shank being provided with screw-threads 33. The member 16 is provided near its upper and horizontally disposed end with a socket or recess 35, adapted to receive the reduced end of the rotatable member 17 that completes the handle for the trowel. Off-setting the adjacent end of the member 17 provides the extension 36 which projects into the recess 35 so that a union is formed to firmly hold the members 16 and 17 together. Reducing the end of the member 17 also provides the shoulder 38 which abuts the adjacent end of the member 16 so that a smooth exterior surface is imparted to the handle unit. The member 17 is further provided with a centrally located longitudinally extending aperture 40 adapted to receive the threaded end of the flexible shank 30. Hence, when it is desired to secure the handle to the trowel blade, the member 17 is rotated so as to draw the threaded end of the flexible shank 30 into the aperture 40. By further rotating the member 17 a pull is exerted on the flexible shank 30 which causes the jaws to be drawn against the sides of the rib 11 while the member 16 is forced into the opposite direction against the surface of the trowel blade so that the handle and the blade are clamped together to form a rigid structure.

Having thus fully described my said invention, what I desire to secure by Letters Patent, is—

1. A trowel comprising a blade, a longitudinally extending dovetailed rib secured to said blade, a cone provided with a slot to receive said dovetailed rib, a hollow curved handle formed of a slidable and a rotatable member, the slidable member having a socket to receive said cone, supporting means for said cone, and a flexible shank on said cone-supporting means to engage and be moved longitudinally by the rotation of said rotatable handle member.

2. A trowel comprising a blade, a longitudinally extending dovetailed rib secured to said blade, a divided cone provided with a slot to receive said dovetailed rib, a hollow curved handle formed of a slidable and a rotatable member, the slidable member having a conical socket to receive said divided cone, supporting means for said divided cone, and a flexible shank on said cone-supporting means to engage and be moved longitudinally by the rotation of said rotatable handle member.

3. A trowel comprising a blade, a longitudinally extending dovetailed rib secured to said blade, a divided cone provided with a slot to receive said dovetailed rib, a hollow curved handle formed of a slidable and a rotatable member, the slidable member having a socket to receive said divided cone, a chain extending through the slidable handle member, a head on the end of said chain adapted to engage the socket in the divided cone, and means on the other end of said chain adapted to engage and be moved longitudinally by the rotation of said rotatable handle member.

In witness whereof, I, have hereunto set my hand and seal at Indianapolis, Indiana, this, 18th day of August, A. D. one thousand nine hundred and eleven.

JOHN B. RUNNER. [L. S.]

Witnesses:
F. W. WOERNER,
J. A. MINTURN.

---

Copies of this patent may be obtained for five cents each, by addressing the "Commissioner of Patents, Washington, D. C."